(12) United States Patent
Xie et al.

(10) Patent No.: US 9,311,489 B2
(45) Date of Patent: Apr. 12, 2016

(54) APPLICATION FORENSICS

(71) Applicant: Microsoft Corporation, Redmond, WA (US)

(72) Inventors: Tianyu Xie, Redmond, WA (US); Shawn T. Sullivan, Seattle, WA (US); Matthew Wood, Sammamish, WA (US); Ryan P. Heaney, Seattle, WA (US); Kyle Von Haden, Mill Creek, WA (US); Peter Anthony Nobel, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/788,931

(22) Filed: Mar. 7, 2013

(65) Prior Publication Data

US 2014/0259148 A1    Sep. 11, 2014

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G06F 21/60 | (2013.01) |
| G06F 21/16 | (2013.01) |

(52) U.S. Cl.
CPC ............. *G06F 21/60* (2013.01); *G06F 21/16* (2013.01); *G06F 2221/0733* (2013.01); *G06F 2221/0737* (2013.01)

(58) Field of Classification Search
CPC ...................................................... G06F 21/30
USPC .......................................................... 726/16
See application file for complete search history.

(56) References Cited

U.S. PATENT DOCUMENTS

| | | | |
|---|---|---|---|
| 7,397,916 B2 | 7/2008 | Johnson et al. | |
| 7,526,733 B1* | 4/2009 | Samson | 715/805 |
| 8,141,159 B2 | 3/2012 | Peled et al. | |
| 8,819,856 B1* | 8/2014 | Tiffe et al. | 726/31 |
| 2003/0070164 A1* | 4/2003 | Berstis | 717/178 |
| 2007/0186283 A1 | 8/2007 | Brumbaugh et al. | |
| 2008/0148371 A1* | 6/2008 | Veneklase | 726/5 |
| 2008/0222734 A1 | 9/2008 | Redlich et al. | |
| 2009/0158441 A1 | 6/2009 | Mohler et al. | |
| 2009/0235087 A1* | 9/2009 | Bird | 713/190 |

OTHER PUBLICATIONS

Derek Bem; Computer Forensic Analysis in a Virtual Environment; International journal of Digital Evidence; Fall 2007, vol. 6, Issue 2; p. 1-13.*
U.S. Appl. No. 13/713,994, filed Dec. 13, 2012.
U.S. Appl. No. 29/393,034, filed May 27, 2011.
U.S. Appl. No. 13/230,708, filed Sep. 12, 2011.

(Continued)

*Primary Examiner* — Monjour Rahim
(74) *Attorney, Agent, or Firm* — Julie Kane Akhter; Sade Fashokun; Micky Minhas

(57) ABSTRACT

Disclosed herein are systems, methods, and software for facilitating application forensics. In least one implementation, the identity of a user associated with an attempt to access an application program that resides in a development environment is determined. Information is generated with which to encode the identity of the user in a various views of the application program rendered in a runtime environment. A reply to the attempt is communicated that includes the information and at least a portion of the application program.

20 Claims, 9 Drawing Sheets

(56) References Cited

OTHER PUBLICATIONS

Michael Arnold, et al.; "Techniques and Applications of Digital Watermarking and Content Protection;" Artech House Computer Security Series; 2003; pp. 1-274; http://www.cse.hcmut.edu.vn/~ttqnguyet/download%20ebook%20here!!!/ISSReferences/Techniques.and.Applications.of.Digital.Watermarking.and.Content.Protection.pdf.

* cited by examiner

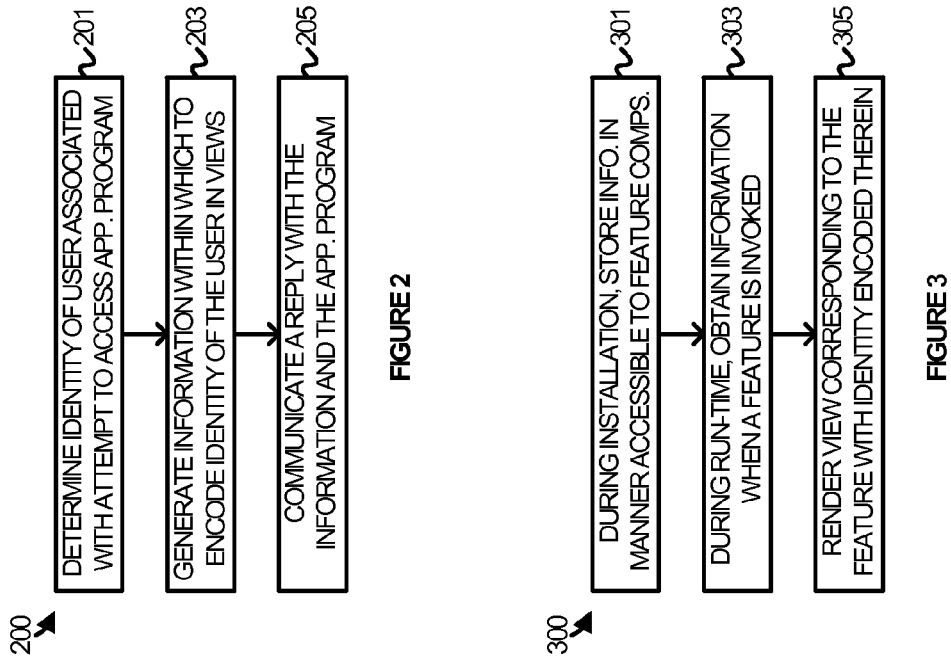
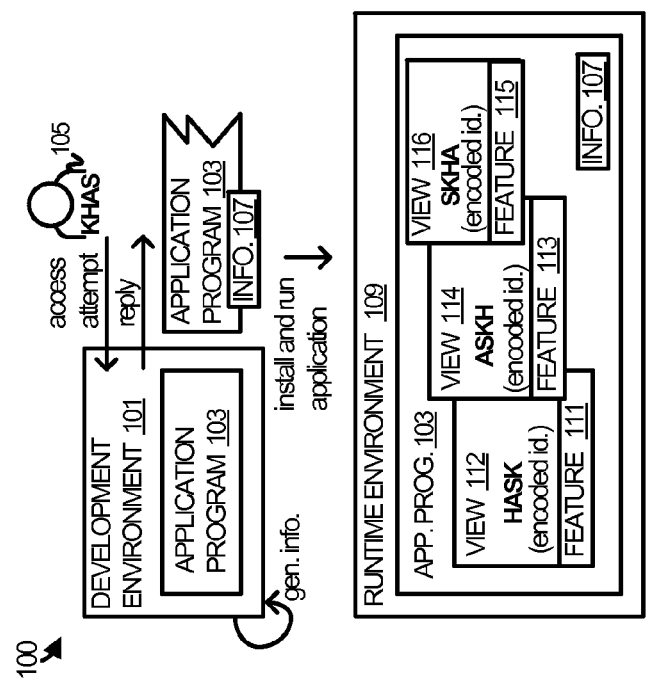

APPLICATION FORENSICS

TECHNICAL FIELD

Aspects of the disclosure are related to computing hardware and software, and in particular, to forensics technology for software development environments.

TECHNICAL BACKGROUND

A variety of techniques can be employed to discourage the unauthorized release of information. The canary trap, or barium meal trap, is just one example that can be useful for identifying the source of and discouraging leaks. With respect to software development, it has become common for screen shots, product roadmaps, and other sensitive content to be leaked prior to the general release of an application. Unfortunately, the source of a leak may be someone on the development team or some other trusted person, making prevention especially difficult in view of their privileged access.

One technique for discouraging software leaks involves digital fingerprinting whereby a fingerprint is generated based on the identity of a user attempting to copy an application from within a development environment. The fingerprint is then copied along with the application such that the identity of the user can be determined upon recovery of the application. While fingerprinting can be effective in discouraging leaks, recovering an unauthorized copy of an application can be difficult and is sometimes unlikely to occur.

Another technique for discouraging leaks involves digital watermarking whereby the identity of a user associated with a runtime environment is encoded into an image that is then leaked via a screen shot. While also effective in some respects, developers or others with privileged access may know where in the image their identity is encoded. For example, the watermarking can be circumvented by obscuring or otherwise eliminating that portion of the image from the screen shot leaked to the public.

OVERVIEW

Provided herein are systems, methods, and software for facilitating application forensics. In least one implementation, the identity of a user associated with an attempt to access an application program that resides in a development environment is determined. Information is generated with which to encode the identity of the user in various views of the application program rendered in a runtime environment. A reply to the attempt is communicated that includes the information and at least a portion of the application program.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an operational architecture for facilitating application forensics in an implementation.

FIG. 2 illustrates a forensics process employed in a development environment in an implementation.

FIG. 3 illustrates a forensics process employed in a runtime environment in an implementation.

TECHNICAL DISCLOSURE

Figure 4:
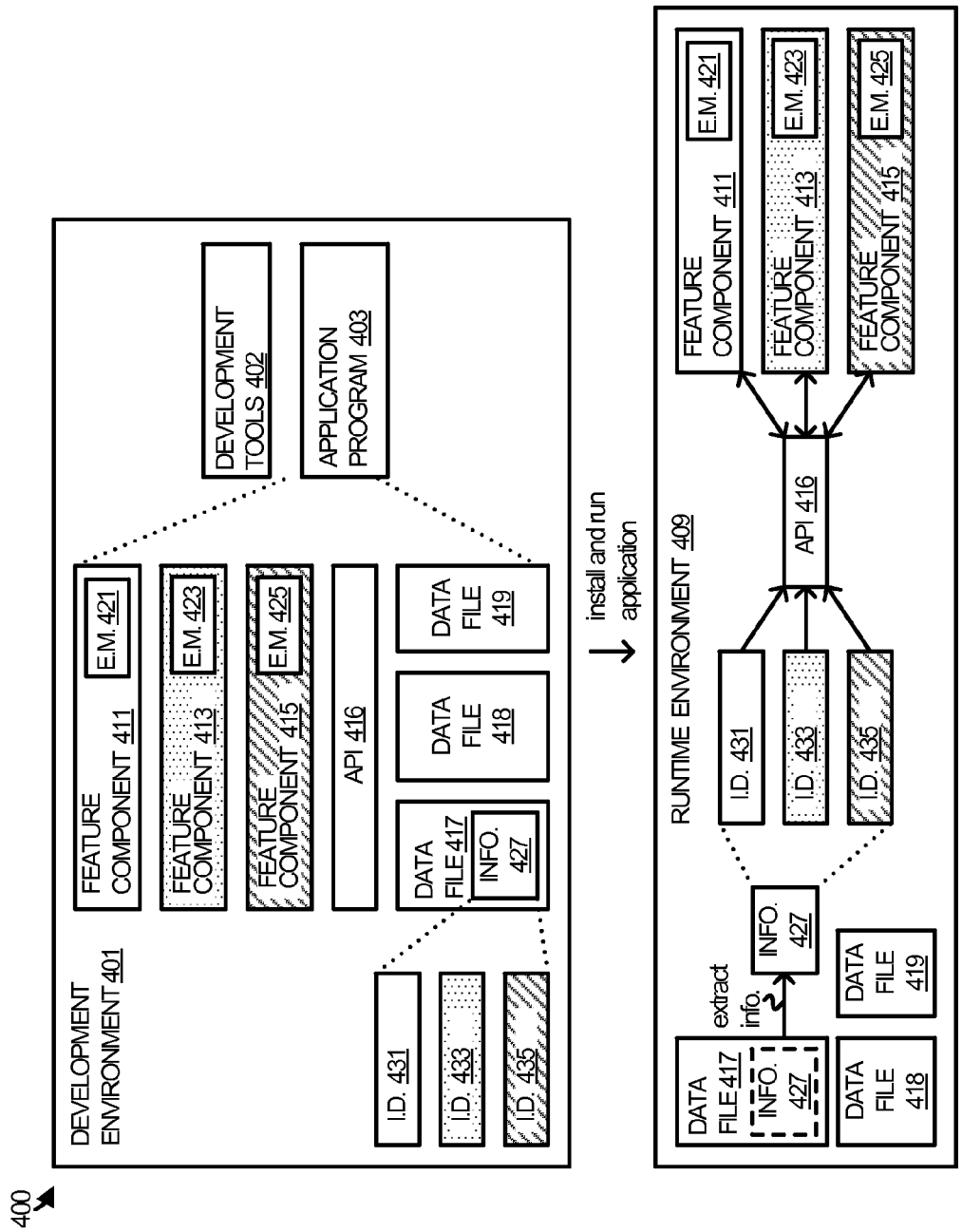
FIG. 4 illustrates an operational architecture for facilitating application forensics in an implementation.

Implementations described herein provide for improved forensics techniques that may serve to discourage and reduce the unauthorized release of screen shots, product documentation, or any other sensitive information related to the development of new software. In various implementations, an application program may reside within a development environment such that developers and other trusted personnel may interact with aspects of the application program to further its development. An attempt to access the application program, such as a copy command, may be responded to by determining the identity of a user associated with the attempt and generating information with which to encode the identity of the user in views of the application program rendered in a runtime environment. A reply to the attempt may then be communicated that includes both the information and at least a portion of the application program.

Upon installing and running the unauthorized copy of the application program, the identity of the user may be encoded in various ways in the views rendered of the application. The installation and execution of the unauthorized copy of the application may be controlled by the same user that was associated with the attempt to access the application program in the development environment, although it may also be the case that the application is transferred to another party and is installed and executed under their control. Screen shots of the various views that are subsequently released will thus include the user's identity, or an encoded version thereof, that may be recognizable and traceable back to the source of the leak.

It may be appreciated that encoding the identity of the user in multiple views rendered within a runtime environment reduces the likelihood that the user can circumvent the encoding. For example, the user may be familiar with one or more of the ways in which the identity is encoded in the views, but not all of the ways. Accordingly, while the user may be able to obscure or otherwise circumvent some of the encoding mechanisms, it is unlikely that the user will be able to circumvent all of the encoding mechanisms. As a result, the unauthorized release of screen shots by the user or some other party associated with the user is likely to include at least one view having the identity of the user encoded therein. Such forensics technology thereby facilitates discovery of the user's identity and discourages such behavior in the first place as most users may appreciate their own inability to circumvent all of the encoding mechanisms.

In some implementations, an application program may include various features and an interface component with which to provide each of the features with access to the information generated in response to the access attempt. In some scenarios the reply to the attempt may include various data files, one of which may have the information written therein. The data files may be used during installation of the application program in the runtime environment. In fact, during installation of the application program the information may be extracted from at least one of the data files and stored in a manner accessible to the various features of the application program through the interface component.

In some implementations, the identity of the user may be encoded in the various views in a visually apparent manner that differs for each of the views. For example, each of the various features of the application program may include several graphical items, such as icons, drop down menus, images, and the like. In some scenarios the visually apparent manner may be an arrangement of the graphical items presented within each corresponding view. For example, the view corresponding to a feature may include several icons. The arrangement of the icons may be determined in such a way so as to encode the identity of the user in the arrangement of the icons. In another example, the order of options in a menu list may be determined in such a way so as to encode the identity of the user in the order of the options.

The information generated in response to the access attempt may in some scenarios include various identifiers. Each of the identifiers may represent the identity of the user. In addition, each of the identifiers may correspond to a different one of the various features of the application program such that the identity of the user may be encoded using a different identifier for each of the features. Moreover, each of the various views may correspond to a different one of the various features. Invoking a feature may initiate rendering of its corresponding view with the identity of the user encoded in the view using the identifier associated with the feature. Invoking a different feature may thus initiate rendering of a different corresponding view with the identity of the user encoded in the view using a different identifier.

In some implementations, the application program includes various feature components associated with the various features of the program that may be executed or otherwise implemented in a runtime environment upon being installed. The feature components, when invoked, communicate with the interface component discussed above to obtain the information with which to encode the identity of the user in each view. The interface component retrieves the relevant information that, when executed by the processing system, directs the processing system to respond to the communication with the information. In various scenarios, the interface component may retrieve the information where it was stored upon being extracted from one or more data files during installation of the application program. The application program may also be considered to include an installation component that initiates or controls extraction during installation of the application program such that the information may be extracted from one or more data files and stored a manner accessible to the feature components through the interface component.

Figure 8:
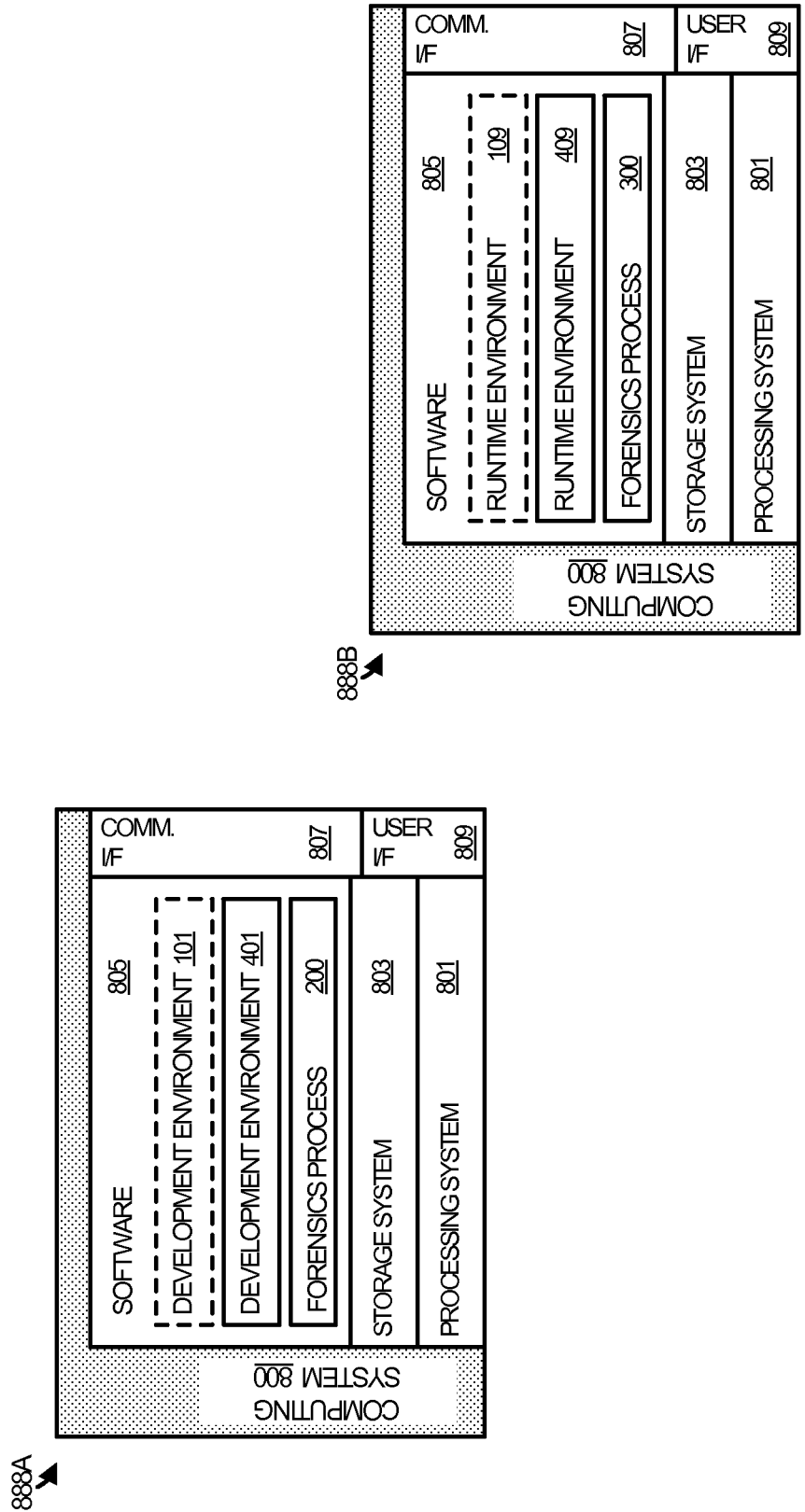
FIG. 8 illustrates a computing system suitable for implementing a development environment or a runtime environment.

FIG. 1 illustrates operational architecture 100 for implementing application forensics in an implementation. Operational architecture 100 includes development environment 101 in which forensics process 200 or variations thereof may be employed as described below in more detail with respect to FIG. 2. Development environment 101 includes application program 103, which may be the target of unauthorized leaks, the discouragement of which may be achieved at least in part by forensics process 200. Examples of application program 103 include productivity applications, operating system software, gaming applications, mobile applications, and communication applications, as well as any other type of application, variation, or combination thereof that may be developed within a development environment. Development environment 101 is representative of any collection of computing hardware and software suitable for developing application program 103 during any stage of development and within which application program 103 may be considered to reside. Computing system 800, discussed in more detail below with respect to FIG. 8, is one exemplary system that may be suitable for implementing development environment 101.

Operational architecture 100 also includes runtime environment 109 in which forensics process 300 or variations thereof may be employed as described in more detail below with respect to FIG. 3. Runtime environment 109 is representative of any collection of computing hardware and software suitable for installing and running application program 103. Computing system 800 is one exemplary system that may be suitable for implementing runtime environment 109.

As mentioned, forensics process 200 and forensics process 300 may be employed within development environment 101 and runtime environment 109 respectively to discourage and deter unauthorized leaks of screen shots and other sensitive information about a software product. The following discussion of forensics process 200 and forensics process 300 will proceed with reference to FIG. 1 and the various steps carried out within the context of each process will be indicated parenthetically for clarity.

Referring now to FIG. 2, in operation a user represented by user 105 may initiate an attempt to copy application program 103 such that application program 103 may be installed and executed and screen shots captured of its associated views. For example, user 105 may determine to capture screen shots a new user interface design, a new menu layout, new functions, or the like, such that the screen shots can be released in an unauthorized manner for viewing by the public. To accomplish this, user 105 may operate a suitable computing system (not shown) to access development environment 101. The attempt may be, for example, a copy operation or some other similar operation.

In response to the access attempt, the identity of the user associated with the attempt—user 105—is determined (step 201). The identity of the user may be determined in a variety of ways, such by referencing a log of users presently signed-in to development environment 101 or a log of users and their association with various computing systems presently having access to development environment 101. In this example, user 105 has a user identity of K-H-A-S, although it may be appreciated that the user identity may take a variety of forms, formats, and the like. It may also be appreciated that determining the identity of the user is a well-known task and the scope of the present discussion is not limited to the exemplary techniques provided herein.

Having determined the identity of user 105 (KHAS), information 107 is generated with which to encode the identity of user 105 in various views of application program 103 (step 203). Information 107 may include the identity of user 105—KHAS. However, information 107 may include an encoded version or versions of the user's identity. In a simple example, multiple scrambled versions of the user's identity may be generated and included with information 107. In another example, an encrypted or otherwise unrecognizable version or multiple versions of the user's identity may be generated and included in information 107. A wide variety of techniques may be employed for generating information 107 and may be considered within the scope of the present disclosure. Note that the identity of the user associated with the attempt is not yet encoded in images or other graphics data that may be used to render views of application program 103. Rather, the encoding process occurs later within runtime environment 109 once application program 103 is installed and executed. But first, a reply to the attempt is communicated that includes at least a portion of application program 103 and the information 107 (step 205).

Referring now to FIG. 3, assuming that the attempt to access application program 103 is successful and user 105 is able to obtain a copy of it, application program 103 is installed and run within runtime environment 109. In some implementations, application program 103 may include various features represented by feature 111, feature 113, and feature 115. Application program 103 may also include feature components (not shown) that provide the features when invoked and executed. During installation, information 107 is stored in a manner accessible to the various feature components that may be included in application program 103 (step 301).

During runtime, the feature components obtain at least a portion of information 107 when invoked or communicate with yet another component to obtain at least a portion of information 107 (step 303). The information is then used to encode the identity of user 105 in various views associated with the features of application program 103. For example, when any of the features is encountered or a corresponding feature component is invoked, a corresponding view may be rendered and presented with the user's identity encoded therein (step 305). The views associated with the features are represented by view 112 corresponding to feature 111, view 114 corresponding to feature 113, and view 116 corresponding to feature 115. Each view includes the identity of user 105 represented in some manner. As a simple example, each view in FIG. 1 includes a scrambled version of the identity of user 105: in view 112 the identity is encoded as H-A-S-K; in view 114 the identity is encoded as A-S-K-H; and in view 116 the identity is encoded as S-K-H-A. It may be appreciated that this technique for encoding the user's identity is merely exemplary and many other techniques may be employed for encoding the identity of a user in a view.

FIG. 4 illustrates another development environment 401 and another runtime environment 409 in an implementation. Development environment 401 is representative of any collection of hardware and software that may be used to develop all or portions of application program 403. Application program 403 may be considered to reside within development environment 401, at least temporarily. Examples of application program 403 include productivity applications, operating system software, gaming applications, mobile applications, and communication applications, as well as any other type of application, variation, or combination thereof that may be developed within a development environment. Runtime environment 409 is representative of any collection of hardware and software suitable for installing and running application program 403. Computing system 800, discussed in more detail below with respect to FIG. 8, is representative of a system suitable for implementing development environment 401 and runtime environment 409.

Development environment 401 includes development tools 402 that may be used to develop all or portions of application program 403. Examples of development tools 402 include editing, compiling, and other coding tools, as well as configuration management tools and project management tools. Development environment 401 also include application program 403. Application program 403 includes feature component 411, feature component 413, and feature component 415. Feature component 411, feature component 413, and feature component 415 may each be representative of any component, object, or collection of components or objects or any other program element capable of being executed to provide corresponding features. Feature component 411 may correspond to a feature of application program 403, such as a particular user interface, an element within a user interface, a function provided by application program 403, or any other type of feature. Feature component 413 and feature component 415 may also correspond to features of application program 403. It may be appreciated that application program 403 may include many more feature components in addition to those disclosed herein.

Feature component 411, feature component 413, and feature component 415 include encoding module 421, encoding module 423, and encoding module 425 for encoding the identity of a user in a view upon invocation of any of the feature components within runtime environment 409. Encoding module 421, encoding module 423, and encoding module 425, when run in runtime environment 409, process at least a portion of information 427 in order to encode the identity of a user in a view.

Application program 403 also includes data file 417, data file 418, and data file 419 for storing information 427. Data file 417, data file 418, and data file 419 are each representative of any file or other type of data structure that may contain data used when installing or executing application program 403 in a runtime environment, such as runtime environment 409. Examples include executable binaries, image files, sound files, extensible markup language (XML) files, or text files, as any other type of data structure that may be considered a part of application program 403. Information 427 may be stored in any one or more of data file 417, data file 418, or data file 419. It may be appreciated that feature components 411, 413, and 415 may be embodied in one or more of data files 417, 418, and 419, but may also be separate therefrom or even partially integrated in some manner.

In some implementations, portions of application program 403 may be digitally signed. To accommodate this, at build time blank data can be inserted in binaries beyond the expected signing range. Information 427 may then be inserted or substituted for the blank data such that the digital signature is not disturbed. In another example, there may be additional unsigned properties within a certificate being used. This data may be modified without disrupting the signature.

Information 427 is generated in response to an attempt on behalf of a user to access application program 403 and is used in runtime environment 409 to encode the identity of the user in views of application program 403. In response to the attempt to copy or otherwise access application program 403, a reply is communicated that includes at least a portion of application program 403, including the data file or files that contain information 427. In this implementation, it is assumed for simplicity of illustration that information 427 is contained within data file 417.

Note that information 427 may not be the actual identity of the user. Rather, information 427 can be used to encode the identity in a view. For example, information 427 may include one or more scrambled versions of a user's identity that can each be presented within a different view. In another example, information 427 may include one or more codes or identifiers with which the user's identity can be encoded in each view. The codes or identifiers could be generated in a wide variety of ways, such as by salting and/or hashing a username with other information provided within development environment 401.

In this illustration, information 427 includes identifier 431, identifier 433, and identifier 435. Identifier 431, identifier 433, and identifier 435 each represent in some manner or have some relation to the identity of a user on behalf of whom an access attempt may occur. It may be appreciated that as few as two identifiers may be used, or more than three and that three identifiers are merely provided for exemplary purposes. By providing more than one identifier, and in particular multiple identifiers that differ relative to each other, the identity of the user may be encoded in a way for each view that differs relative to other views. This may decrease the likelihood that the user associated with the attempt or another user in cooperation with that user can circumvent the encoding.

In fact, encoding module 421, encoding module 423, and encoding module 425 may each be developed by different developers or different teams of developers, further reducing the likelihood that a single user can circumvent the encoding of their identity within views of application program 403. For example, encoding module 421 may be developed by one group of developers, while encoding module 423 may be developed by a second group of developers, and the encoding mechanism provided by each module may presumably differ relative to the other. Thus, for a single user to be able to circumvent both modules, the user would have to know how both modules encode the user's identity. The presence of additional encoding modules makes such a situation even less likely, and thus increases the deterrence value. For example, it would be even less likely that any single developer is familiar with or have sufficient knowledge about three, or four, or even half a dozen or more encoding modules to allow them to be successfully circumvented.

In addition, the presence of multiple identifiers included with information 427 allows the multiple identifiers to be stored in varying locations relative to each other during installation. During installation, information 427 can be extracted from data file 417 and each identifier 431, identifier 433, and identifier 435 stored in different locations within runtime environment 409. In this manner, a user determined to release screen shots is less likely to circumvent the operation of any of encoding module 421, encoding module 423, or encoding module 425 because he or she is unlikely to know where each of the identifiers is stored. In other words, it would be difficult for the user to alter all of the identifiers in their respective locations since he or she will be unaware of all of their locations, even though he or she may be aware of some of their locations.

Upon any of feature component 411, feature component 413, and feature component 415 being invoked in runtime environment 409, communication is initiated with application program interface (API) 416 to retrieve or otherwise obtain the relevant identifier with which to encode the identity of the user. API 416 retrieves the relevant one of identifier 431, identifier 433, and identifier 435 depending on which one of feature component 411, feature component 413, and feature component 415 is invoked. For example, when feature component 413 makes such a request, API 416 returns identifier 433. Encoding module 423 can then be invoked by feature component 413, or possibly by some other element, to encode the identity of the user in a view associated with feature component 413. It may be appreciated that other elements in addition to or in place of feature component 413 and encoding module 423 may be involved in obtaining identifier 433 and encoding the identity of the user in the view.

Figure 5:
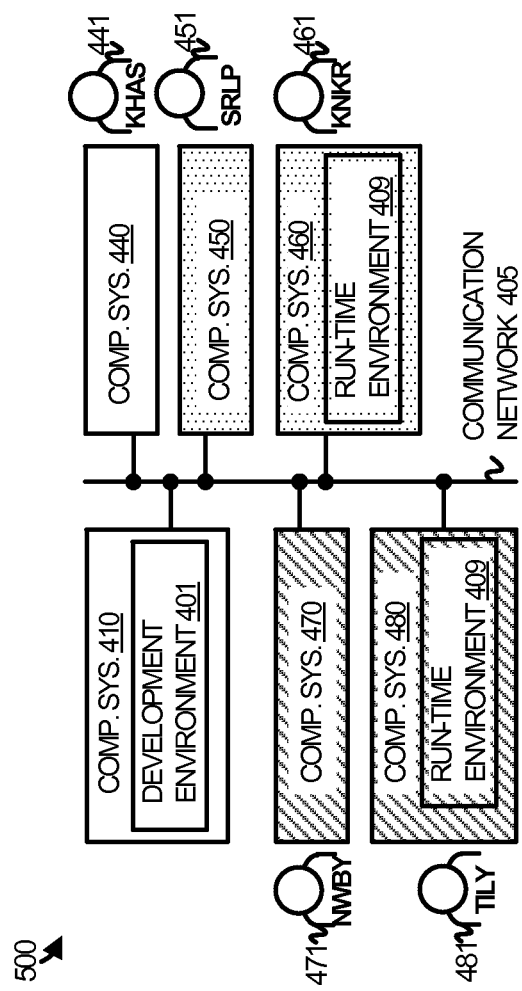
FIG. 5 illustrates a computing environment in an implementation.

FIG. 5 illustrates a computing environment 500 within which an operational architecture for facilitating application forensics may be implemented. For illustrative purposes computing environment 500 includes or its associated discussion makes reference to operational architecture 400 and possibly other elements illustrated in FIG. 4, although it may be appreciated that computing environment 500 may be suitable for implementing any operational architecture, including operational architecture 100. In this illustration, computing environment 500 includes computing system 410. Computing system 410 is representative of any system or collection of systems suitable for providing a development environment, such as development environment 401. Computing environment 500 also includes a communication link 405 over which computing system 410 may communicate with other computing systems, including computing systems 440, 450, 460, 470 and 480. Referring briefly to FIG. 8, computing system 800 is representative of a computing system suitable for implementing any of computing systems 410, 440, 450, 460, 470 and 480, discussed in more detail below.

In some examples, communication link 405 may be representative of a network or collection of networks, such as an intranet, the Internet, a local area network, a wide area network, a wireless network, a wired network, or any combination or variation thereof. Communication link 405 may include connections, devices, and communication media, such as metal, glass, air, or any other suitable communication media over which communications may be exchanged. The aforementioned communication media, network, connections, and devices are well known and need not be discussed at length here.

Computing system 440, 450, 460, 470, and 480 may each be representative of any system or collection of systems capable of communicating with computing system 410 over communication link 405 to facilitate application development on behalf of or under the control of application developers. In this illustration, computing system 441, 450, 460, 470, and 480 are operated by or otherwise associated with user 441, 451, 461, 471, and 481 respectively. Any or all of the computing systems may also be capable of providing a runtime environment. For illustrative purposes, computing system 460 and computing system 480 include instances of runtime environment 409.

User 441, 451, 461, 471, and 481 may belong to various groups of developers that are responsible for developing various aspects of application program 403. It is assumed for illustrative purposes in FIG. 5 that user 441 belongs in one group, user 451 and user 461 belong in another group, and user 471 and user 481 belong in yet another group as indicated by the shading of various elements in FIG. 5. Each group may be responsible for developing various aspects of application program 403, such as a particular feature component. Referring back to the shading applied in FIG. 4 to some elements, it may be appreciated how the user groups defined in FIG. 5 may be associated with the feature elements found in FIG. 4. In particular, it may be assumed for illustrative purposes that user 441 is associated with feature component 411, user 451 and user 461 are associated with feature component 413, and user 471 and user 481 are associated with feature component 415. Accordingly, the users are also associated and indeed may actually develop the encoding modules associated with each of the feature components.

Figure 6:
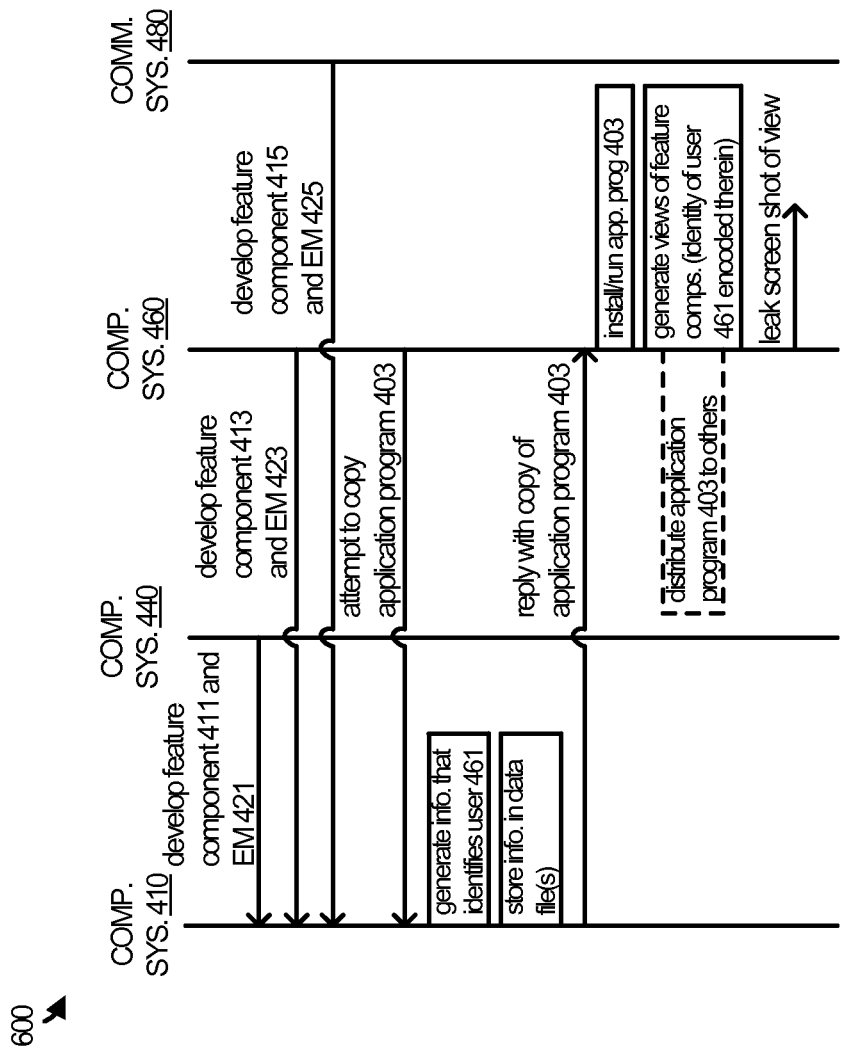
FIG. 6 illustrates a sequence diagram representative of some exemplary operations that facilitate application forensics.

FIG. 6 illustrates sequence diagram 600 describing various operations that may occur with respect to computing environment 500. In operation, user 441 interacting with computing system 440, user 441 may participate in the development of feature component 411 and possibly encoding module 421.

Interacting with computing system 460, user 461 may participate in developing feature component 413 and encoding module 423. Interacting with computing system 480, user 481 may participate in the development of feature component 415 and encoding module 425.

One of the users may at some point attempt to copy application program 403 in order to leak or assist with leaking screen shots of views provided by the program. In FIG. 6, it is assumed for illustrative purposes that user 461 engages in such behavior, causing computing system 460 to communicate with computing system 410 in order to access application program 403 within development environment 401.

In response to the access attempt, computing system 410 (employing forensics process 200 or some variation thereof) determines the identity of user 461 and generates information indicative of the same, represented in FIG. 4 by information 427. Computing system 410 then stores the data in one or more of data file 417, 418, and 419 such that information 427 may be communicated when the copy attempt is served. Computing system 410 replies to the copy attempt with application program 403, or a copy thereof, including data file 417 which includes information 427.

User 461 may elect to install and run application program 403 on computing system 460 in order to capture screen shots of various views. For example, user 461 may capture screen shots of views corresponding to feature component 411, 413, and 415. Upon invoking any of feature components 411, 413, and 415, the invoked feature component communicates with API 416 in order to obtain the portion of information 427 relevant to that feature component. A view is then rendered in association with the feature component and has the identity of user 461 encoded therein.

For example, a view associated with feature component 411, or a view of a feature associated with feature component 411, may be generated that includes the identity of user 461 encoded in some fashion. Because user 461 is associated with the development of feature component 413, it is unlikely that he or she will know how or where in the view of feature component 411 his or her identity is encoded. A leaked screen shot of the view will therefore have the identity encoded in some manner, allowing user 461 to be identified as the source of the leak.

It may be appreciated that instead of, or in addition to, installing and running application program 403 on computing system 460, user 461 may distribute application program 403 to another user for installation and execution on another computing platform. User 461 may also install and run application program 403 on a computing platform other than computing system 460. Regardless, the installation and execution of application program 403 would proceed in the same way as described above with respect to computing system 460.

Figure 7:
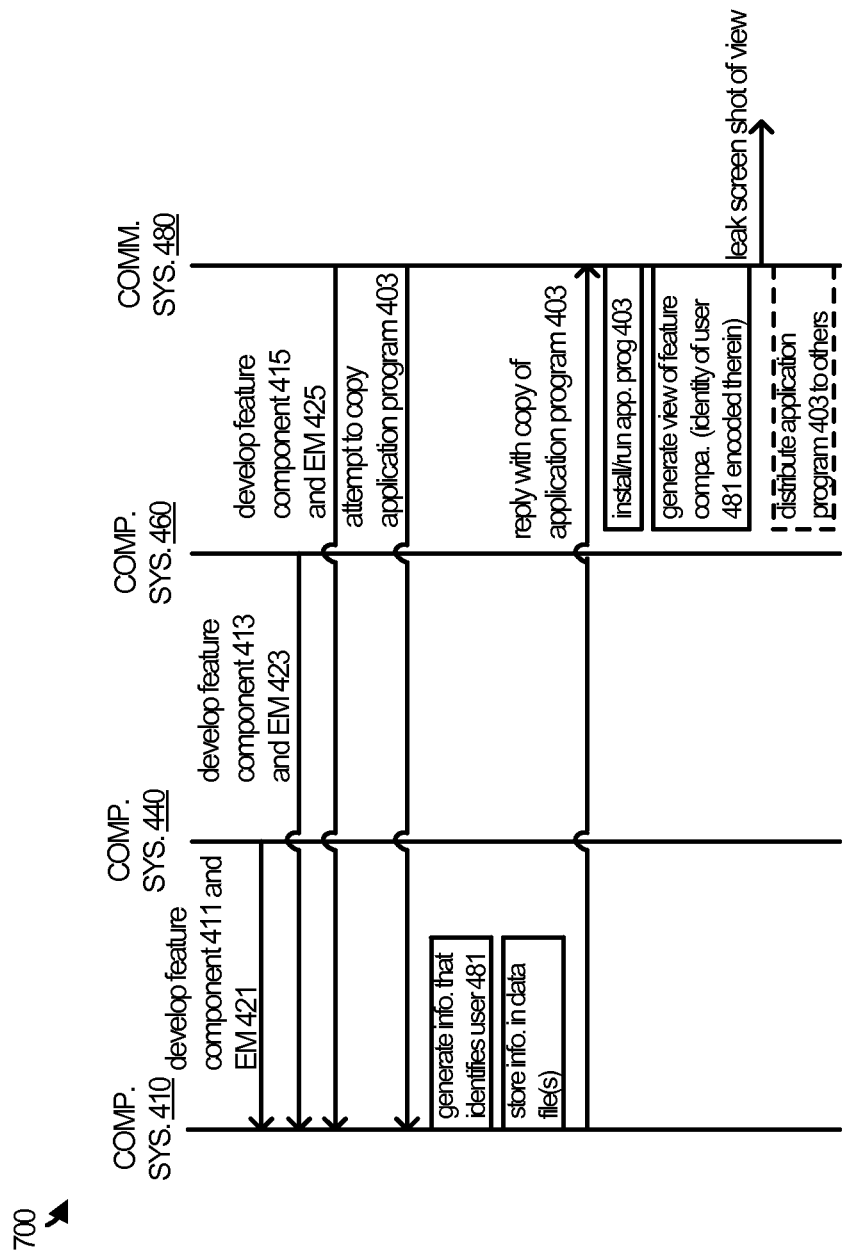
FIG. 7 illustrates another sequence diagram representative of some exemplary operations that facilitate application forensics.

FIG. 7 illustrates another sequence diagram 700 describing various other operations that may occur with respect to computing environment 500. In operation, user 441 interacting with computing system 440 may participate in the development of feature component 411 and possibly encoding module 421. Interacting with computing system 460, user 461 may participate in developing feature component 413 and encoding module 423. Interacting with computing system 480, user 481 may participate in the development of feature component 415 and encoding module 425.

One of the users may at some point attempt to copy application program 403 in order to leak or assist with leaking screen shots of views provided by the program. In FIG. 7, it is assumed for illustrative purposes that user 481 engages in such behavior, causing computing system 480 to communicate with computing system 410 in order to access application program 403 within development environment 401.

In response to the access attempt, computing system 410 (employing forensics process 200 or some variation thereof) determines the identity of user 481 and generates information indicative of the same, represented in FIG. 4 by information 427. Computing system 410 then stores the data in one or more of data file 417, 418, and 419 such that information 427 may be communicated when the copy attempt is served. Computing system 410 replies to the copy attempt with application program 403, or a copy thereof, including data file 417 which includes information 427.

User 481 may elect to install and run application program 403 on computing system 480 in order to capture screen shots of various views. For example, user 481 may capture screen shots of views corresponding to feature components 411, 413, and 415. Upon invoking any of feature components 411, 413, and 415, the invoked feature component communicates with API 416 in order to obtain the portion of information 427 relevant to that feature component. A view is then rendered in association with the feature component and has the identity of user 481 encoded therein.

For example, a view associated with feature component 411, or a view of a feature associated with feature component 411, may be generated that includes the identity of user 481 encoded in some fashion. Because user 481 is associated with the development of feature component 415, it is unlikely that he or she will know how or where in the view of feature component 411 his or her identity is encoded. A leaked screen shot of the view will therefore have the identity encoded in some manner, allowing user 481 to be identified as the source of the leak.

It may be appreciated that instead of, or in addition to, installing and running application program 403 on computing system 480, user 481 may distribute application program 403 to another user for installation and execution on another computing platform. User 481 may also install and run application program 403 on a computing platform other than computing system 480. Regardless, the installation and execution of application program 403 would proceed in the same way as described above with respect to computing system 480.

Figure 9:
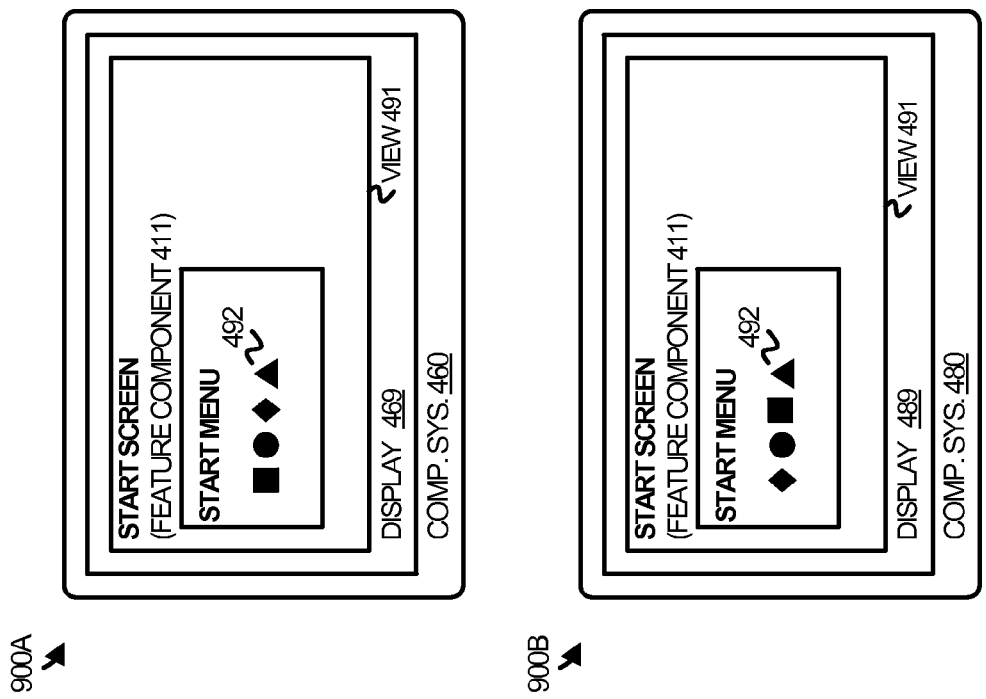
FIG. 9 illustrates various operational scenarios in an implementation.

Referring now to FIG. 9, operational scenarios 900A and 900B illustrate in more detail how the identity of a user may be encoded in a view of application program 403 in a visually apparent manner. Operational scenario 900A generally relates to sequence diagram 600 whereby user 461 installs and launches application program 403 on computing system 460. Operational scenario 900B generally relates to sequence diagram 700 whereby user 481 installs and runs application program 403 on computing system 480.

With respect to operational scenario 900A, computing system 460 includes display 469 that displays view 491. View 491 is representative of a view of feature component 411. It is assumed for exemplary purposes that feature component 411 is associated with a start menu feature.

The start menu feature includes various graphical items 492 that may be representative of, for example, icons selectable by a user to launch other features or functions of application program 403. In operational scenario 900A, encoding module 421 encodes the identity of user 461 by arranging the icons in a particular order. In this scenario, the graphical items 492 are arranged in the following order: square, circle, diamond, and triangle. The specific arrangement may be determined or directed based on identifier 431. For example identifier 431 may be a code that signals to encoding module 421 how to arrange the graphical items 492 so that user 461 can be uniquely identified from the arrangement.

It may be appreciated from operational scenario 900B that graphical items 492 may be arranged in a different way to encode the identity of a different user relative to operational scenario 900A. In operational scenario 900B, computing system 480 includes display 489 that displays view 491. View 491 is representative of a view of feature component 411, which for exemplary purposes is assumed to be associated with a start menu feature. As mentioned, the start menu feature includes various graphical items 492 that may be representative of, for example, icons selectable by a user to launch other features or functions of application program 403.

In operational scenario 900B, encoding module 421 encodes the identity of user 481 by arranging the icons in a particular order. In this scenario, the graphical items 492 are arranged in the following order: diamond, circle, square, and triangle. Note how this arrangement differs from the arrangement illustrated with respect to operational scenario 900B. The specific arrangement may be determined or directed based on identifier 431. For example identifier 431 may be a code that signals to encoding module 421 how to arrange the graphical items 492 so that user 481 can be uniquely identified from the arrangement.

Figure 10:
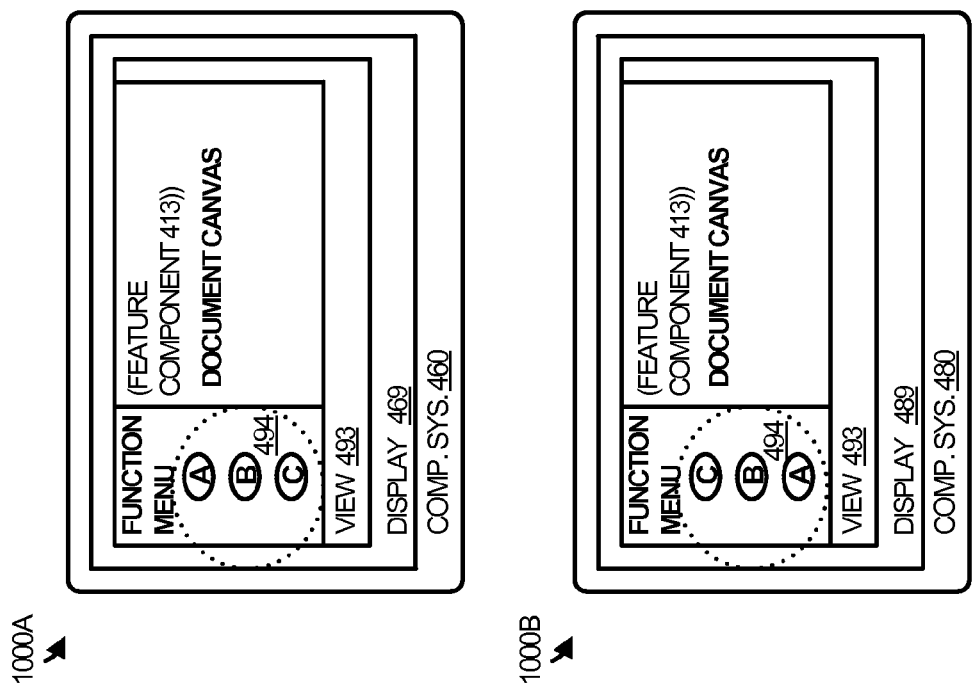
FIG. 10 illustrates various operational scenarios in an implementation.

Referring now to FIG. 10, operational scenarios 1000A and 1000B illustrate another possible implementation of application forensics for encoding the identity of a user in a visually apparent manner. Operational scenario 1000A generally relates to sequence diagram 600 whereby user 461 installs and launches application program 403 on computing system 460. Operational scenario 1000B generally relates to sequence diagram 700 whereby user 481 installs and launches application program 403 on computing system 480.

With respect to operational scenario 1000A, computing system 460 includes display 469 that displays view 493. View 493 is representative of a view of feature component 413. It is assumed for exemplary purposes that feature component 413 is associated with a function menu within a productivity application that has a canvas.

The function menu feature includes various graphical items 494 that may be representative of, for example, menu options selectable by a user to launch other features or functions of application program 403. In operational scenario 1000A, encoding module 423 encodes the identity of user 461 by arranging the menu options in a particular order. In this scenario, the graphical items 494 are arranged in the following order: "A," "B," and "C." The specific arrangement may be determined or directed based on identifier 433. For example identifier 433 may be a code that signals to encoding module 423 how to arrange graphical items 494 so that user 461 can be uniquely identified from the arrangement.

It may be appreciated from operational scenario 1000B that graphical items 494 may be arranged in a different way to encode the identity of a different user relative to operational scenario 1000A. In operational scenario 1000B, computing system 480 includes display 489 that displays view 493. View 493 is representative of a view of feature component 413, which for exemplary purposes is assumed to be associated with the function menu as discussed above. As mentioned, the function menu feature includes various graphical items 494 that may be representative of, for example, menu options selectable by a user to launch other features or functions of application program 403.

In operational scenario 1000B, encoding module 423 encodes the identity of user 481 by arranging the menu options in a particular order. In this scenario, the graphical items 494 are arranged in the following order: "C," "B," and "A." Note how this arrangement differs from the arrangement illustrated with respect to operational scenario 1000A. The specific arrangement may be determined or directed based on identifier 433. For example identifier 433 may be a code that signals to encoding module 423 how to arrange the graphical items 494 so that user 481 can be uniquely identified from the arrangement.

Figure 11:
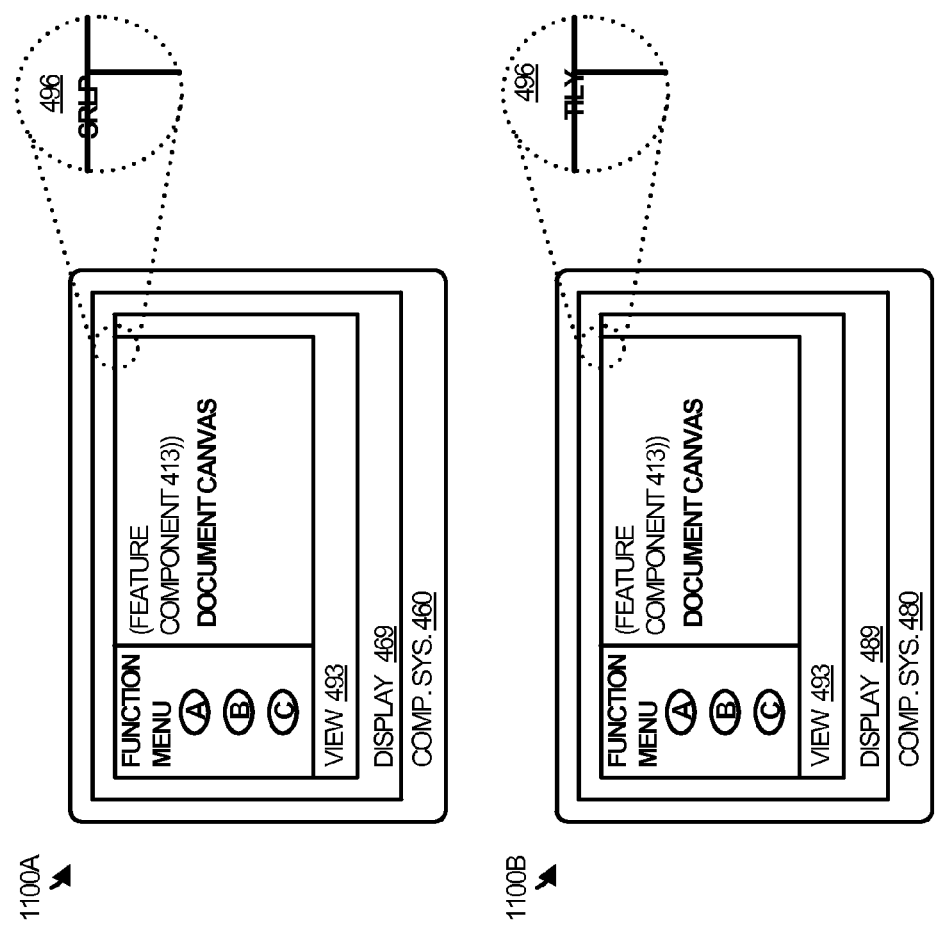
FIG. 11 illustrates various operational scenarios in an implementation.

FIG. 11 includes operational scenarios 1100A and 1100B that illustrate yet another way in which user identities may be encoded in views associated with application program 403 in a visually apparent manner. In operational scenario 1100A, the identity of user 461 (SRLP) is encoded in a border within view 493. In operational scenario 1100B, the identity of user 481 (TILY) is also encoded in a border within view 493. As may be appreciated from focus area 496, the text of the user's identity may be encoded in such a way that it is barely perceptible or not perceptible at all without the aid of a viewing tool. Such encoding is representative of another way in which encoding module 423 could potentially encode the identity of the user. While in operational scenario 1100A the user's actual identity is used, it may be appreciated that other representations of the user's identity, such as a scrambled, salted, or hashed form, may be employed. Likewise, the actual identity of user 481 may be substituted with a code, such as a scrambled, slated, or hashed form of the identity, or some other suitable form.

Referring back to FIG. 8, computing system 800 is representative of any computing apparatus, system, or collection of systems suitable for implementing any of the computing systems illustrated in FIG. 5 or discussed with respect to FIG. 6 and FIG. 7, such as a third party's computer. In particular, computing system 800 is also suitable for implementing a development environment, such as development environment 101 or development environment 401, as illustrated by scenario 888A. Computing system 800 may also be suitable for implementing a runtime environment, such as runtime environment 109 or runtime environment 409, as illustrated by scenario 888B.

Examples of computing system 800 include general purpose computers, server computers, cloud computing platforms, data centers, virtual computing platforms, or distributed computing platforms, as well as any other type, variation, or combination thereof that may be suitable for implementing all or portions of a development environment. Other examples of computing system 800 include desktop computers, laptop computers, notebook computers, computing appliances, entertainment appliances, gaming appliances, tablet computers, mobile devices, server computers, and virtual computing platforms, as well any other type, variation, or combination thereof that may be suitable for implementing all or portions of a runtime environment.

Computing system 800 includes processing system 801, storage system 803, software 805, communication interface 807, and user interface 809. Processing system 801 is operatively coupled with storage system 803, communication interface 807, and user interface 809. Processing system 801 loads and executes software 805 from storage system 803. With respect to scenario 888A, when executed by computing system 800 in general, and processing system 801 in particular, software 805 directs computing system 800 to operate as described herein for forensics process 200 or variations thereof in support of development environment 101 or development environment 401. With respect to scenario 888B, when executed by computing system 800 in general, and processing system 801 in particular, software 805 directs computing system 800 to operate as described herein for forensics process 300 or variations thereof in support of runtime environment 109 or runtime environment 409. Computing system 800 may optionally include additional devices, features, or functionality not discussed here for purposes of brevity.

Referring still to FIG. 8, processing system 801 may comprise a microprocessor and other circuitry that retrieves and executes software 805 from storage system 803. Processing system 801 may be implemented within a single processing device but may also be distributed across multiple processing devices or sub-systems that cooperate in executing program instructions. Examples of processing system 801 include general purpose central processing units, application specific processors, and logic devices, as well as any other type of processing device, combinations, or variations thereof.

Storage system 803 may comprise any computer readable storage media readable by processing system 801 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations storage system 803 may also include communication media over which software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 801.

Software 805 may be implemented in program instructions and among other functions may, when executed by computing system 800 in general or processing system 801 in particular, direct computing system 800 or processing system 801 to operate as described herein for forensics process 200 or forensics process 300. Software 805 may include additional processes, programs, or components, such as operating system software or other application software. Software 805 may also comprise firmware or some other form of machine-readable processing instructions executable by processing system 801.

In general, software 805 may, when loaded into processing system 801 and executed, transform computing system 800 overall from a general-purpose computing system into a special-purpose computing system customized to facilitate application forensics as described herein for each implementation. Indeed, encoding software 805 on storage system 803 may transform the physical structure of storage system 803. The specific transformation of the physical structure may depend on various factors in different implementations of this description. Examples of such factors may include, but are not limited to the technology used to implement the storage media of storage system 803 and whether the computer-storage media are characterized as primary or secondary storage.

For example, if the computer-storage media are implemented as semiconductor-based memory, software 805 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 800 is generally intended to represent a computing system with which software 805 is deployed and executed in order to implement forensics process 200 or forensics process 300 (and variations thereof) and development environment 101 and development environment 401 or runtime environment 109 and runtime environment 409. However, computing system 800 may also represent any computing system on which software 805 may be staged and from where software 805 may be distributed, transported, downloaded, or otherwise provided to yet another computing system for deployment and execution, or yet additional distribution.

Referring again to FIG. 1 and FIG. 4 with respect to scenario 888A, through the operation of computing system 800 employing software 805, transformations may be performed with respect to development environment 101 or development environment 401. As an example, development environment 101 could be considered transformed from one state to another when subject to forensics process 200 or variations thereof. In a first state, information is yet to be generated in response to an access attempt. In a second state, information 107 is generated in development environment 101 in response to the access attempt, thereby changing development environment 101 to a different state. As another example, development environment 401 could be considered transformed from one state to another when subject to forensics process 200 or variations thereof. In a first state, information is yet to be generated in response to an access attempt. In a second state, information 427 is generated in development environment 401 in response to the access attempt, thereby changing development environment 401 to a different state.

Referring still to FIG. 1 and FIG. 4 but with respect to scenario 888B, through the operation of computing system 800 employing software 805, transformations may be performed with respect to runtime environment 109 or runtime environment 409. As an example, runtime environment 109 could be considered transformed from one state to another when subject to forensics process 300 or variations thereof. In a first state, views are yet to be generated having the identity of a user encoded therein using the information generated during the execution of forensics process 200. In a second state, views are generated that each have the identity of the user encoded therein, thereby changing runtime environment 109 to a different state. As another example, runtime environment 409 could be considered transformed from one state to another when subject to forensics process 300 or variations thereof. In a first state, views are yet to be generated having the identity of a user encoded therein using the information generated during the execution of forensics process 200. In a second state, views are generated that each have the identity of the user encoded therein, thereby changing runtime environment 409 to a different state.

Referring again to FIG. 8, communication interface 807 may include communication connections and devices that allow for communication between computing system 800 and other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface 809, which is optional, may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 809. Display 469 and display 489 illustrated in FIGS. 9-11 are examples of user interface 809. The aforementioned user interface components are well known and need not be discussed at length here.

Various technical aspects may be appreciated from the present discussion. For example, by encoding the identity of a user in views of an application program in a visually apparent manner, screen shots leaked of the views are likely to include the identity of the user or some representation thereof. Not only may this allow for tracking back to the source of a leak, but future leaks may be discouraged. In addition, by encoding the identity of the user in multiple views and in different ways for each of the multiple views, any single user is unlikely to be able to circumvent the encoding.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for facilitating application forensics, the method comprising:
   a computing device;
   in response to an attempt to access an unauthorized copy of an application program that resides in a development environment, determining an identity of a user associated with the attempt;
   generating information with which to encode the identity of the user in a plurality of views of the unauthorized copy of the application program rendered in a runtime environment;
   communicating a reply to the attempt comprising the information and at least a portion of the unauthorized copy of the application program; and
   encoding the identity of the user in a visually apparent manner;
   wherein each of the plurality of views of the unauthorized copy of the application program corresponds to a different one of a plurality of features of the unauthorized copy of the application program that, when invoked, initiates rendering of a corresponding view of the plurality of views with a corresponding identifier encoded in the visually apparent manner.

2. The method of claim 1 wherein the unauthorized copy of the application program comprises an interface component with which to provide each of the plurality of features the information.

3. The method of claim 2 wherein the reply to the attempt further comprises a plurality of data files one or more of which having the information written therein and wherein the method further comprises, during installation of the unauthorized copy of the application program, extracting the information from at least one of the plurality of data files and storing the information in a manner accessible to the plurality of features through the interface component.

4. The method of claim 3 wherein encoding the identity of the user in a visually apparent manner differs for each of the plurality of views.

5. The method of claim 4 wherein the information comprises a plurality of identifiers, each of the plurality of identifiers representative of the identity of the user and corresponding to a different one of the plurality of features of the unauthorized copy of the application program.

6. The method of claim 1 wherein each of the plurality of features comprises a plurality of graphical items, wherein the visually apparent manner comprises an arrangement of the plurality of graphical items presented within the corresponding view.

7. The method of claim 6 further comprising encoding the corresponding identifier in the arrangement of the plurality of graphical items presented within the corresponding view.

8. One or more computer readable storage device having program instructions stored thereon for facilitating application forensics that, when executed by a computing system, direct the computing system to at least:
   in response to an attempt to access an unauthorized copy of an application program associated with a development environment, determine an identity of a user associated with the attempt;
   generate information with which to encode the identity of the user in a plurality of views of the unauthorized copy of the application program rendered in a runtime environment;
   communicate a reply to the attempt comprising the information and at least a portion of the unauthorized copy of the application program; and
   encode the identity of the user in a visually apparent manner;
   wherein each of the plurality of views of the unauthorized copy of the application program corresponds to a different one of a plurality of features of the unauthorized copy of the application program that, when invoked, initiates rendering of a corresponding view of the plurality of views with a corresponding identifier encoded in the visually apparent manner.

9. The one or more computer readable storage device of claim 8 wherein the unauthorized copy of the application program comprises an interface component with which to provide each of the plurality of features with the information.

10. The one or more computer readable storage device of claim 9 wherein the reply to the attempt further comprises a plurality of data files for use during an installation process, one or more of which having the information written therein for extraction and storage during the installation process in a manner accessible to the plurality of features through the interface component.

11. The one or more computer readable storage device of claim 10 wherein the program instructions further direct the computing system to encode the identity of the user in a visually apparent manner that differs for each of the plurality of views.

12. The one or more computer readable storage device of claim 11 wherein the information comprises a plurality of identifiers, each of the plurality of identifiers representative of the identity of the user and corresponding to a different one of the plurality of features of the unauthorized copy of the application program.

13. The one or more computer readable storage device of claim 8 wherein each of the each of the plurality of features comprises a plurality of graphical items, wherein the visually apparent manner comprises an arrangement of the plurality of graphical items presented within the corresponding view.

14. The one or more computer readable storage device of claim 13 wherein the program instructions further direct the computing system to encode the corresponding identifier in the arrangement of the plurality of graphical items presented within the corresponding view.

15. A computing apparatus for facilitating application forensics comprising:
  one or more computer readable storage device; and
  an application program stored on the one or more computer readable storage media and comprising program instructions for facilitating application forensics, the program instructions comprising:
    a plurality of feature components associated with a plurality of features of the application program that, when executed by a processing system, direct the processing system to initiate communication between the plurality of feature components and an interface component to obtain information with which to encode, in a visually apparent manner that differs in each of a plurality of views associated with the plurality of features, an identity of a user associated with an unauthorized attempt to access the application program; and
    the interface component that, when executed by the processing system, directs the processing system to respond to the communication with the information.

16. The computing apparatus of claim 15 wherein the interface component, when executed by the processing system, further directs the processing system to obtain the information from where the information was stored during installation of the application program, wherein the application program further comprises a plurality of data files, one or more of which having the information written therein, and wherein the program instructions further comprise:
  an installation component that, when executed by the processing system, directs the processing system to at least extract during installation of the application program the information from at least one of the plurality of data files and initiate storage of the information in a manner accessible to the plurality of feature components through the interface component.

17. The computing apparatus of claim 15 wherein each of the plurality of features comprises a plurality of graphical items, wherein the visually apparent manner comprises a different arrangement of the plurality of graphical items in each of the plurality of views.

18. The computing apparatus of claim 15 further comprising a display system to display the plurality of views and the processing system to execute at least the plurality of feature components and the interface component.

19. The computing apparatus of claim 15, wherein the information comprises a plurality of identifiers, each of the plurality of identifiers representative of the identity of the user and corresponding to a different one of the plurality of features of the unauthorized copy of the application program.

20. The computing apparatus of claim 17, wherein the program instructions further direct the processing system to encode the corresponding identifier in the arrangement of the plurality of graphical items presented within the corresponding view.

* * * * *